United States Patent [19]

Screen

[11] Patent Number: 5,139,116
[45] Date of Patent: Aug. 18, 1992

[54] CASTOR WITH BRAKE MECHANISM

[76] Inventor: Stafford T. Screen, 66 Stevens Road, Wollescote, Stourbridge, West Midlands, DY9 0XY, England

[21] Appl. No.: 650,011

[22] Filed: Feb. 4, 1991

[30] Foreign Application Priority Data

Feb. 6, 1990 [GB] United Kingdom ............... 9002555

[51] Int. Cl.$^5$ .............................................. B60D 33/00
[52] U.S. Cl. ..................................... 188/1.12; 188/74; 16/35 R
[58] Field of Search ................ 188/1.12, 74; 16/35 R, 16/47, 45

[56] References Cited

U.S. PATENT DOCUMENTS

| 4,550,808 | 11/1985 | Folson ................................. 188/74 |
| 4,559,668 | 12/1985 | Black ................................. 16/35 R |
| 4,677,706 | 7/1987 | Screen ................................ 16/35 R |
| 4,821,369 | 4/1989 | Daniels ............................. 188/1.12 |
| 4,911,269 | 3/1990 | Perl ................................... 188/1.12 |

FOREIGN PATENT DOCUMENTS

| 0417417 | 3/1991 | European Pat. Off. . | |
| 2461179 | 6/1976 | Fed. Rep. of Germany | 16/35 R |
| 3111169 | 11/1982 | Fed. Rep. of Germany | 16/35 R |
| 1584745 | 2/1981 | United Kingdom | 16/35 R |
| 2132478 | 7/1984 | United Kingdom . | |

Primary Examiner—Joseph F. Peters, Jr.
Assistant Examiner—Anne E. Bidwell
Attorney, Agent, or Firm—Young & Thompson

[57] ABSTRACT

A caster has two wheels with tires non-rotatably secured to a wheel center and shaped with an internal cylindrical drum surface. A brake member pivoted on the caster body has two side walls with out-turned edge portions engageable with respective drum surfaces. The engagement may be at an upper position, or opposite the ground-engaging portion of the wheels.

17 Claims, 3 Drawing Sheets

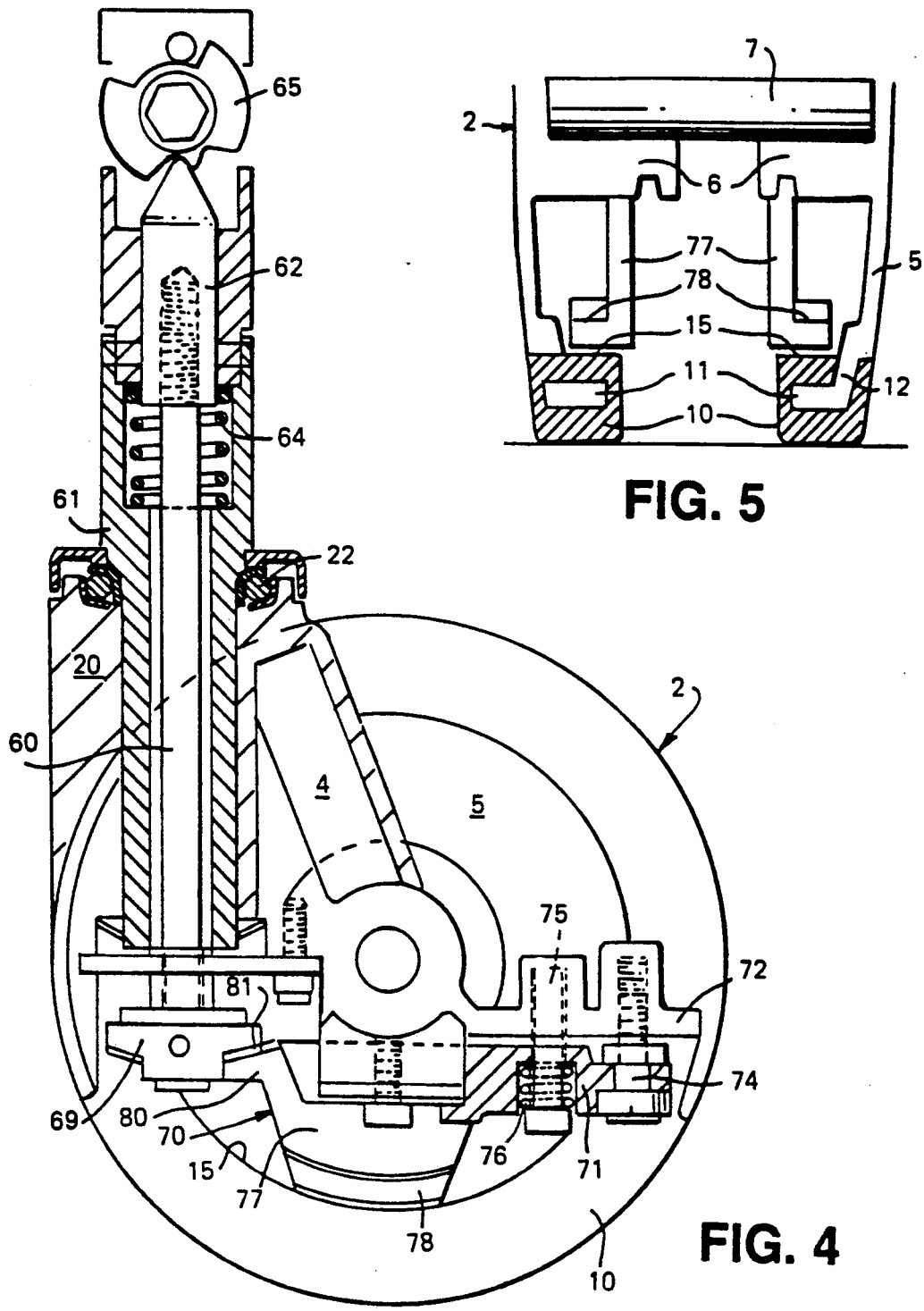

CASTOR WITH BRAKE MECHANISM

FIELD OF THE INVENTION

The invention relates to casters and more particularly to casters incorporating a braking mechanism whereby rotation of the caster wheel or wheels can be selectively prevented or opposed.

BACKGROUND OF THE INVENTION

A variety of caster braking mechanisms are known in which for example a brake element frictionally engages the top of the wheel tire or rim, or frictionally or mechanically engages a drum portion of the wheel internally of its periphery.

It is an object of the present invention to provide frictional braking arrangements for casters which afford improved economy of manufacture and improved efficiency of operation.

SUMMARY OF THE INVENTION

The invention accordingly provides a wheel for a caster, the wheel comprising a wheel center and a tire fitted thereto, the tire itself having an internal surface for engagement by a brake element. The invention also provides a caster including one or two of such wheels and a braking mechanism operable to apply a brake element thereof against the internal surface of the tire.

The braking surface of the tire typically has the same frictional characteristics of the outer peripheral portion of the tire which engages the ground or support surface, and is conveniently configured as an internal drum or cylindrical surface centered on the wheel axis.

The braking effort applied by the caster brake element acts on the wheel at a position which, although located internally of the wheel outer periphery, can be quite close to it, the separation being no more than the radial extent of the tire. The invention is particularly appropriate for twin-wheel casters, in which the tire braking surfaces can be located at the opposed, internal faces of the wheels, with the brake elements engageable with them received between the wheels.

So that forces tending to turn the caster wheel when braked are not carried by the brake mechanism, the tire is preferably locked to the wheel center by mechanical interengagement. The tire can thus be moulded directly onto the wheel center rim, the rim being configured to prevent relative rotation of the center and the tire, as by including a ring providing a core for tire connected to the inner part of the center by a web which is slotted or otherwise apertured to receive moulded tire material.

The invention thus also provides a caster or having a mounting stem for mounting the caster on an article to be supported, a caster body carried by the stem for rotation about an upright swivel axis, two caster wheels journalled on the body for rotation about a wheel axis spaced from the swivel axis, each wheel having a tire with an internal cylindrical brake surface, and a brake mechanism selectively operable to engage a brake element with each of the tire brake surfaces. The brake elements are conveniently carried by a brake member pivotably mounted on the caster body for movement to engage the tire brake surfaces preferably over a substantial circumferential length. The engagement can be at any desired position around the tire, for example at its lowest region, opposite the ground or support surface on which the caster rests.

The brake mechanism can operate in any appropriate way and can if desired incorporate means for latching the caster body against swivelling when the mechanism is operated, or in a predetermined swivelling orientation.

BRIEF DESCRIPTION OF THE DRAWINGS

The invention is further described below, by way of example, with reference to the accompanying drawings, in which:

FIG. 4 is a sectional side view of a second caster embodying the invention; and

FIG. 5 is a partial sectional end view of the caster of FIG. 4.

Figure 1:
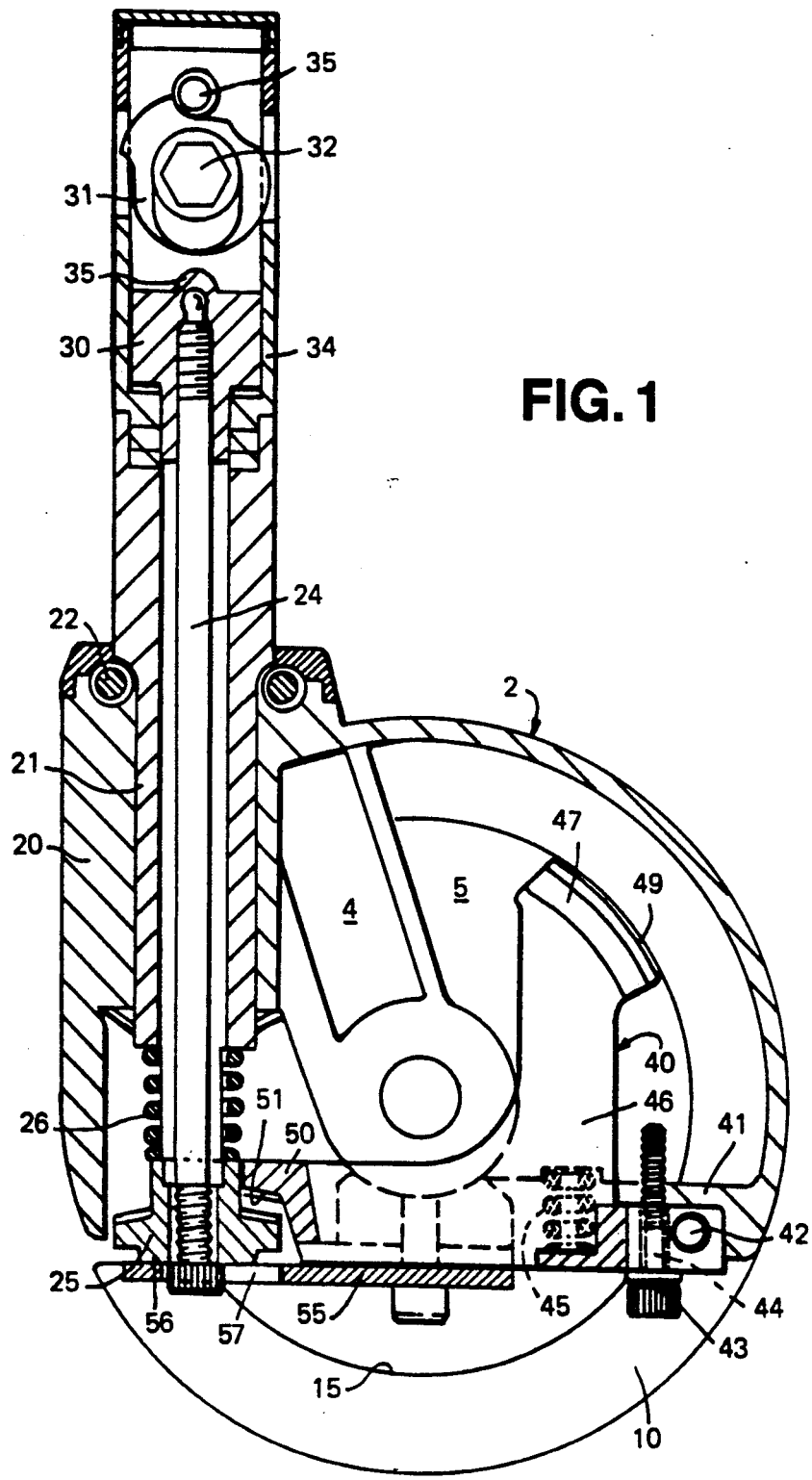
FIG. 1 is a sectional side view of a first caster embodying the invention.
Figure 2:
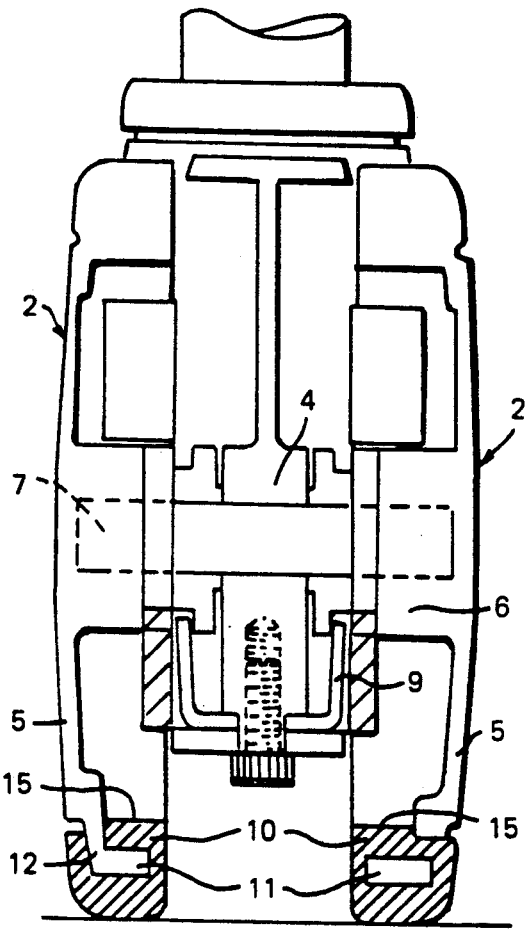
FIG. 2 is a sectional end view of the caster of FIG. 1.
Figure 3:
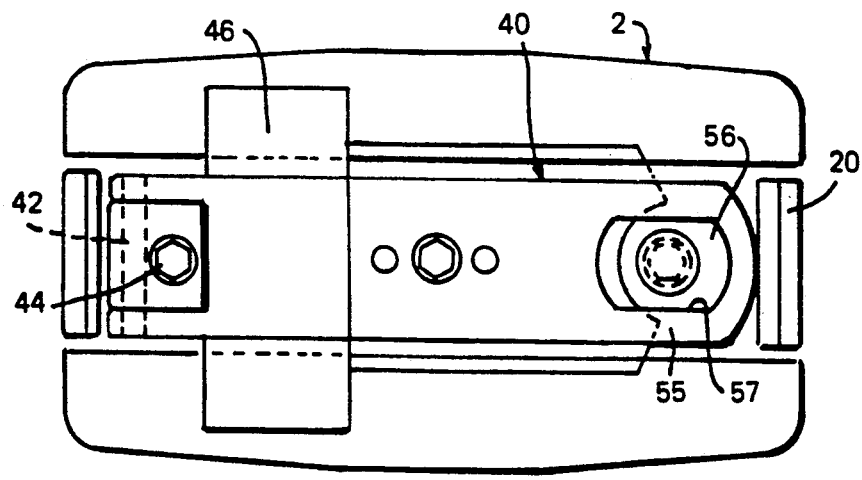
FIG. 3 is an underneath view of the caster, partially broken away.

The caster illustrated in FIGS. 1-3 comprises a pair of like wheels 2 journalled on a central portion 4 of a caster body located between them. As best appears from FIG. 2, each wheel 2 comprises a slightly outwardly dished wheel center 5, with a hub 6 projecting inwardly, by which the wheel is journalled on a shaft 7 extending through an aperture in the body portion 4. The wheels 2 are retained against axial movement by a channel member 9 secured to the body portion 4 and extending into grooves in the hubs 6.

Each wheel center 5 has an outer rim configuration by which a tire 10 is fixedly secured to it. The rim comprises an outer ring 11, of generally rectangular cross-section, extending inwardly of the adjacent inner part of the wheel center and connected to it by a web 12 which is perforated by a series of slots or other apertures extending around it. The tire 10 is moulded onto the wheel center 5 so as to be immovable relative to it because of the portions of the tire material which extend through the perforations in the web 12. The tire material can be rubber but is preferably a plastics material, for example polyurethane, which has a longer life although a lower coefficient of friction. The tire 10 could be moulded from nylon material where a still lower friction coefficient can be tolerated.

As seen in cross-section, the tire 10 is very roughly square, with a markedly rounded lower outer corner. The ring 11 provides a rigid core for the tire, being substantially centrally located within the tire cross-section and being surrounded over those parts of the tire which are adjacent the slots or apertures in the web 12. The outer surface of the wheel center 5 is approximately flush with the outer side surface of the tire 10, and as the ring 11 extends inwardly, the tire has a free internal cylindrical or drum surface 15 concentric with the wheel axis of quite substantial axial extent.

Forwardly of the center portion 4, the caster body has an integrally formed portion 20 with an upright circular cross-section bore in which is received a hollow stem 21 forming part of the mounting structure by which the caster can be mounted on the article which it is to support. A bearing 22 permits rotation of the body on the stem about a swivel axis which is generally vertical in use.

A rod 24 is longitudinally slidable within the stem 21 and carries at its lower end a fitting 25 engaged by the lower end of a spring 26 around the rod of which the upper end bears against the stem 21, so that the spring urges the rod and fitting downwardly. At its upper end, the rod 24 is secured, by screw-threaded means permitting axial adjustment, to a yoke 30 which is part of a cam mechanism. For acting on the yoke 30 the cam mechanism also includes a cam 31 rotatable about an axis 32 transversely of a housing 34 mounted at the upper end of the stem 21 and forming a continuation thereof. In the position shown, cam followers 35 carried by the yoke 30 are engaged by portions of the cam 31 shaped to permit a lowered position of the rod 24, to which it is urged by the spring 26. The cam 31 can be selectively rotated to raise the rod 24 and thus the fitting 25, with compression of the spring 26. Such upward movement of the rod 24 effects braking of the two caster wheels by a brake member 40.

The brake member 40 comprises a rear mounting portion by which the brake member is mounted on a rearwardly projecting portion 41 of the caster body center portion 4. Mounting is effected by means of a pivot pin 42 extending through the center portion and spaced side portions of the brake member. An adjustment bolt 44 extends through a pair of Belleville spring washers 43 and through an aperture in the brake member 40 into a tapped hole in the body portion. Forwardly from the bolt 44, a compression spring 45 extends between the body portion 41 and the brake member. The angular position of the brake member 40 when inoperative can be slightly adjusted by tightening or loosening the bolt 44 against the pressure of the spring and the washers 43 provide a small amount of resilience in the braking system, of particular utility where the tires 10 are of rather rigid material for example nylon.

Extending forwardly and upwardly from the rear mounting portion of the brake member 40 are two spaced parallel side plates 46, each having an outwardly directed brake portion 47 at its free end. The brake portions 47 have arcuate or part cylindrical outer surfaces, which may be constituted by applied layers 49 of braking material of suitable frictional characteristics, which are directly opposed to the inner and drum surfaces 15 of the tires 10 and which are centered approximately on the wheel axis.

The side plates 46 have forwardly projecting portions bridged by an end portion 50 having in side view generally an inverted L-shape, so as to provide a forwardly projected lower surface 51 which overlies and partially surrounds the fitting 25.

As will be evident from FIG. 1, rotation of the cam 31 to pull the rod 24 and the fitting 25 upwardly against the spring 26 will engage the fitting with the undersurface 51 of the brake member end portion 50, causing pivotation of the brake member about the pin 42 so as to engage its brake surfaces with the inner drum surfaces 15 of the tires 10. The caster wheels 2 are thus frictionally braked against rotation by direct engagement with the tires 10 at a position which is radially spaced from the wheel periphery only by the thickness of the tire.

The rod 24 is preferably held against rotation relative to the stem 21, conveniently, as shown, by providing the rod and the bore through the stem with hexagonal cross-sections. The fitting 25 and the end portion 50 can be provided with teeth so that the braking action also latches the caster against swivelling of the body relative to the mounting structure.

Furthermore, if desired, the fitting 25 can be provided with means for inter-engagement with a latching plate 55 secured beneath the caster body center portion to project forwardly to beneath the fitting, so as to provide for latching of the caster body in a predetermined angular position relative to the mounting structure. Thus, as shown, the underside of the fitting carries or is formed with a lower noncircular plate portion 56 which can enter a similarly shaped aperture 57 in the plate 55. The cam mechanism operating on the rod 24 must then provide for a further, lower, position of the fitting to achieve this form of latching.

The caster illustrated in FIGS. 4 and 5 has a structure generally similar to that of the caster of FIGS. 1-3 and the description below is accordingly confined to points of difference. In the caster of FIGS. 4 and 5, a rod 60 slidable longitudinally within a hollow stem 61 carries at its upper end a cam follower 62 acted upon from below by a spring 64 received in a recess at the upper end of the stem. The cam follower 62 is consequently urged upwardly against a cam 65 by the spring and the braking action is effected by rotation of the cam 65 to move the rod 60, and a fitting 69 at its lower end, downwardly.

The caster includes a brake member 70 having rearwardly a mounting portion 71 adjustably carried by a rearwardly extending portion 72 of the body member center portion 4. Mounting is effected by a bolt 74 extending through the brake member mounting portion 71 into a tapped hole in the body member portion 72. This connection permits pivotal movement of the brake member about an axis, parallel to the wheel axis. Inwardly of the bolt 74 a second bolt 75, having a spring 76 around it acting between the bolt head and the brake member mounting portion 71, extends through an aperture in the brake member portion into a tapped hole in the body member portion 72, to provide adjustment for the inoperative position of the brake member.

Extending forwardly from the brake member mounting portion 71 are two spaced parallel side walls 77 each of which turns outwardly at its free lower end to provide a brake portion 78 with an arcuate brake surface adjacent the inner drum surface 15 of a respective one of the tires 10. The brake surfaces may again be constituted by a layer of friction material secured to the brake member.

The side walls 77 of the brake member are bridged at their forward ends by a portion 80 to provide a generally upwardly facing surface 81 engageable by an underside of the fitting 69. It will be evident that downward movement of the rod 60 and fitting 69 due to rotation of the cam 65 urges the brake member 70 to pivot downwardly to effect frictional braking of the wheels 2, which can be released by returning the cam to a position allowing the rod 60 and the fitting 69 to move upwardly under the action of the spring 64.

Arrangements for latching against swivelling, similar to those described in connection with the caster of FIGS. 1-3 can be incorporated in the caster of FIGS. 4 and 5 also if desired.

As will be evident to those skilled in the art, the invention can be embodied in a variety of ways other than as specifically described and illustrated without departing from its scope.

I claim:

1. A caster comprising:
   a mounting stem, said mounting stem being adapted for mounting the said caster to an article to be supported thereby,
   a caster body, said caster body being carried by said stem for rotation on said stem about an upright swivel axis, at least one wheel journalled on said body for rotation about a wheel axis spaced from said swivel axis, said at least one wheel having a tire providing a brake surface, said brake surface being spaced inwardly of the outer periphery of said tire, and a brake mechanism including a brake element, said brake mechanism being selectively operable to engage said brake element with said brake surface of said at least one wheel in the lowest region thereof.

2. The caster of claim 1 wherein said brake element is adapted to engage the, or each, brake surface over a substantial circumferential length.

3. A caster comprising:
a mounting stem, said mounting stem being adapted for mounting the said caster to an article to be supported thereby,
a caster body, said caster body being carried by said stem for rotation on said stem about an upright swivel axis,
at least one wheel journalled on said body for rotation about a wheel axis spaced from said swivel axis, said at least one wheel having a tire providing a brake surface, said brake surface being spaced inwardly of the outer periphery of said tire, and
a brake mechanism, said brake mechanism comprising:
a brake member,
pivot means mounting said brake member on said body for pivotation about an axis substantially parallel to said wheel axis,
an operating rod,
guide means mounting said operation rod for reciprocal lengthwise movement along said swivel axis to engage said brake member at a position thereon spaced from said pivot means, and
a brake element on said brake member between said pivot means and said operating rod for engagement with said brake surface of said at least one wheel on operation of said brake mechanism.

4. The caster of claim 3 having two of said wheels, said wheels being located with said brake surfaces thereof and said intermediate portion of said brake member between said wheels.

5. The caster of claim 4 wherein said brake member intermediate portion comprises spaced parallel side walls with out-turned edge portions constituting said brake elements.

6. The caster of claim 5 wherein said side walls extend upwardly from beneath said wheel axis to said out-turned edges.

7. The caster of claim 5 wherein said side walls extend downwardly from beneath said wheel axis to said out-turned edges.

8. The caster of claim 7 having means permitting adjustment of the disengaged position of said brake mechanism.

9. The caster of claim 3 wherein said brake mechanism further comprises a cam engaged with said operating rod and rotatable to cause said rod to engage and disengage said brake element and said brake surface.

10. The caster of claim 3 wherein said brake element is located on said brake member in a position to engage an upper region of said brake surface of said at least one wheel on operation of said brake mechanism.

11. The caster of claim 3 wherein said brake element is located on said brake member at a position thereon between said pivot means and said operating rod.

12. A caster comprising:
a mounting stem, said mounting stem being adapted for mounting the said caster to an article to be supported thereby,
a caster body, said caster body being carried by said stem for rotation on said stem about an upright swivel axis,
at least one wheel journalled on said body for rotation about a wheel axis spaced from said swivel axis,
said at least one wheel comprising a wheel caster and a tire non-rotatably molded onto said wheel center, said tire having an outer peripheral surface and a cylindrical brake surface radially inwardly of and concentric with said outer periphery surface, and said wheel center having at the outer periphery thereof a portion received within said molded tire and located radially between said brake surface and said outer peripheral surface, and
a brake mechanism including a brake element, said brake mechanism being selectively operable to engage said brake element with said tire brake surface of said at least one wheel.

13. The caster of claim 12 wherein said wheel center portion comprises a ring and a web inwardly of said ring, said web being provided with perforations, and said tire being non-rotatably secured to said rim by portions of said tire received in said perforations.

14. The caste wheel of claim 13 wherein said tire is approximately rectangular in cross-section with said ring extending generally centrally thereof.

15. The caster of claim 12 wherein said brake element is engageable with said tire brake surface of said at least one wheel at the lower region thereof.

16. The caster of claim 12 having two of said wheels journalled on said body for rotation about said wheel axis, wherein said cylindrical brake surfaces are located on the axially inner sides of said wheels, and wherein said wheel center portions comprise rings extending axially inwardly of said wheel centers.

17. The caster of claim 12 wherein said brake element is movably upwardly to engage said tire brake surface of said at least one wheel.

* * * * *